(12) United States Patent
Ganzer

(10) Patent No.: US 7,703,705 B2
(45) Date of Patent: Apr. 27, 2010

(54) APPARATUS AND METHOD FOR DISPENSING A MIXTURE OF A GAS AND A FLUID MATERIAL

(75) Inventor: Charles P. Ganzer, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 128 days.

(21) Appl. No.: 11/939,150

(22) Filed: Nov. 13, 2007

(65) Prior Publication Data

US 2008/0197209 A1 Aug. 21, 2008

Related U.S. Application Data

(60) Provisional application No. 60/890,377, filed on Feb. 16, 2007.

(51) Int. Cl.
  A62C 5/00 (2006.01)
  A62C 31/00 (2006.01)
  B05B 7/04 (2006.01)
  F23D 11/36 (2006.01)
  F23D 14/62 (2006.01)
  A62C 5/02 (2006.01)

(52) U.S. Cl. ............... 239/398; 239/433; 239/434; 239/135; 239/8; 118/30

(58) Field of Classification Search ............... 239/135, 239/137, 592, 593, 597; 118/300
See application file for complete search history.

(56) References Cited

U.S. PATENT DOCUMENTS

| 4,059,466 A | 11/1977 | Scholl et al. |
| 4,059,714 A | 11/1977 | Scholl et al. |
| 4,073,409 A * | 2/1978 | Gardner et al. ............ 222/146.5 |
| 4,396,529 A | 8/1983 | Price et al. |
| 4,527,712 A | 7/1985 | Cobbs, Jr. et al. |
| 4,778,631 A * | 10/1988 | Cobbs et al. ................ 261/128 |
| 4,791,142 A | 12/1988 | Pleuse et al. |
| 4,894,277 A | 1/1990 | Akasaki |

(Continued)

FOREIGN PATENT DOCUMENTS

DE 4305866 A1 9/1994

(Continued)

OTHER PUBLICATIONS

European Patent Office, International Search Report issued in corresponding European Application serial No. 08151030.7 fated Sep. 8, 2008 (5 pages).

(Continued)

*Primary Examiner*—Len Tran
*Assistant Examiner*—James S Hogan
(74) *Attorney, Agent, or Firm*—Wood, Herron & Evans, LLP

(57) ABSTRACT

Apparatus and methods for generating and dispensing a mixture containing a pressurized gas and a fluid material. The apparatus includes a mixing device having a mixing chamber and a mixer inside the mixing chamber. A gas injection device, which is coupled with the mixing device, injects the pressurized gas into the fluid material in the mixing chamber. The mixer operates to combine the pressurized gas with the fluid material to form a mixture, which is subsequently dispensed from a dispenser coupled with the mixing device.

17 Claims, 10 Drawing Sheets

U.S. PATENT DOCUMENTS

| | | |
|---|---|---|
| 5,056,034 A | 10/1991 | Rucki et al. |
| 5,207,352 A * | 5/1993 | Porter et al. .................... 222/1 |
| 5,246,143 A * | 9/1993 | Cherfane ................ 222/145.2 |
| 5,480,589 A | 1/1996 | Belser et al. |
| 5,524,828 A | 6/1996 | Raterman et al. |
| 5,556,471 A * | 9/1996 | Boccagno et al. ........... 118/300 |
| 6,357,670 B2 * | 3/2002 | Ganan-Calvo ................. 239/8 |
| RE40,319 E * | 5/2008 | Ophardt et al. .......... 222/181.1 |
| 7,429,146 B2 * | 9/2008 | Hall et al. .................... 404/93 |

FOREIGN PATENT DOCUMENTS

| | | | |
|---|---|---|---|
| DE | 3637918 | A1 | 6/1998 |
| EP | 0370487 | A1 | 5/1990 |
| FR | 2483320 | A1 | 12/1981 |

OTHER PUBLICATIONS

Nordson Corporation, "FoamMix System", product brochure 1999, 2003 (2 pages).

Nordson Corporation "The Nordson FoamMelt Process", product brochure 1989 (4 pages).

European Patent Office, Partial European Search Report issued in corresponding European Application No. EP08151030 dated Jun. 19, 2008 (5 pages).

* cited by examiner

APPARATUS AND METHOD FOR DISPENSING A MIXTURE OF A GAS AND A FLUID MATERIAL

CROSS-REFERENCE TO RELATED APPLICATIONS

This application claims the benefit of U.S. Provisional Application No. 60/890,377, filed Feb. 16, 2007, which is hereby incorporated by reference herein in its entirety.

FIELD OF THE INVENTION

This invention relates generally to dispensing apparatus and methods and, more particularly, to apparatus and methods for forming and dispensing a mixture of a gas and a fluid material.

BACKGROUND OF THE INVENTION

Fluid media and materials, such as polymeric materials like thermoplastic hot melt adhesives, polymeric coatings, paints, and other thermoplastic and/or thermosetting materials, may be foamed before being dispensed. To that end, conventional dispensing systems may introduce a gas, such as nitrogen, carbon dioxide, or shop air, into solution with a pressurized fluid material. Volumes of the compressible gas are entrained in the incompressible fluid material. When the fluid material is dispensed, the entrained volumes of gas rapidly expand and are trapped within the fluid material to generate a foamed fluid material. These trapped cells comprise small bubbles of gas distributed throughout the fluid material.

One fluid material that may be dispensed in a foamed state is molten hot melt adhesive. One effect of the gas bubbles is to act as small insulators, which lengthens the open time of a foamed hot melt adhesive for product positioning. Another effect of the gas bubbles is to reduce the working viscosity of the hot melt adhesive so that the foamed hot melt adhesive is more spreadable. Because the foamed hot melt adhesive spreads easier to cover more surface area, adhesive consumption is reduced.

Foamed hot melt adhesives feature improved performance characterized by high bond strength, longer set times, stronger bonding to porous or irregular surfaces, the ability to dispense on inclined or vertical surfaces, and improved bonding to conductive materials. Foamed hot melt adhesives reduce costs by reducing adhesive consumption. The product appearance is improved by the ability to bond heat-sensitive materials, the whiteness of the adhesive, and the narrow bond line.

Sealants represent another fluid material that may be dispensed in a foamed state to create closed-cell foam seals that act as effective, long-lasting barriers against air, dust, vapor, and fluids in various applications. The sealant may be any pumpable material, such as polyurethane, silicone, or plastisol. Because a gas is used, foamed sealants retain their fundamental physical properties, such as temperature resistance and chemical resistance. The use of this "foam-in-place" technology for sealants reduces the use of expensive materials such as polyurethanes and silicones, improves compressibility and resilience, and reduces cure time. Foamed sealants can be applied by robotic devices, which is less labor intensive than manually applying die-cut gaskets. Automated foam-in-place gasketing increases production, reduces labor and material costs, and improves quality through accurate and consistent gasket placement.

Although conventional dispensing systems for foamed fluid materials are adequate for their intended purpose, it would nevertheless be desirable to provide simplified dispensing apparatus and methods for efficiently and inexpensively introducing a gas into a fluid material.

SUMMARY OF THE INVENTION

In accordance with one embodiment, a gas injection device includes a main body having an inlet configured to receive a pressurized gas, an outlet configured to exhaust the pressurized gas, a gas passage connecting the inlet and the outlet, and a control orifice in the gas passage. The control orifice is configured to meter a flow rate of the pressurized gas flowing to the outlet. The gas injection device further includes a flow control element in the gas passage. The flow control element has a first condition in which the pressurized gas can flow in the gas passage from the inlet through the control orifice to the outlet and a second condition in which the pressurized gas is blocked from flowing to the outlet.

In accordance with another embodiment, an apparatus is provided for dispensing a mixture of a pressurized gas and a fluid material. The apparatus comprises a mixing device including a mixing chamber confining a stream of the fluid material and a mixer inside the mixing chamber. The mixer is configured to combine the pressurized gas with the stream of the fluid material to form the mixture. A dispenser is coupled in fluid communication with the mixing chamber. The dispenser is configured to receive and dispense the mixture. The apparatus further includes a gas injection device having an inlet configured to receive the pressurized gas, an outlet coupled with the mixing device, and a gas passage between the inlet and the outlet. The gas injection device is configured to communicate the pressurized gas from the inlet through the gas passage to the outlet and from the outlet into the mixing chamber.

In accordance with another embodiment, a method comprises injecting a pressurized gas into a stream of a fluid material flowing through a mixing chamber, combining the pressurized gas with the fluid material inside the mixing chamber to form the mixture, and dispensing the mixture. The pressurized gas is directly supplied to the mixing chamber.

BRIEF DESCRIPTION OF THE DRAWINGS

The accompanying drawings, which are incorporated in and constitute a part of this specification, illustrate embodiments of the invention and, together with a general description given above, and the detailed description of the embodiments given below, serve to explain the principles of the invention.

DETAILED DESCRIPTION OF THE PREFERRED EMBODIMENTS

Figure 1:
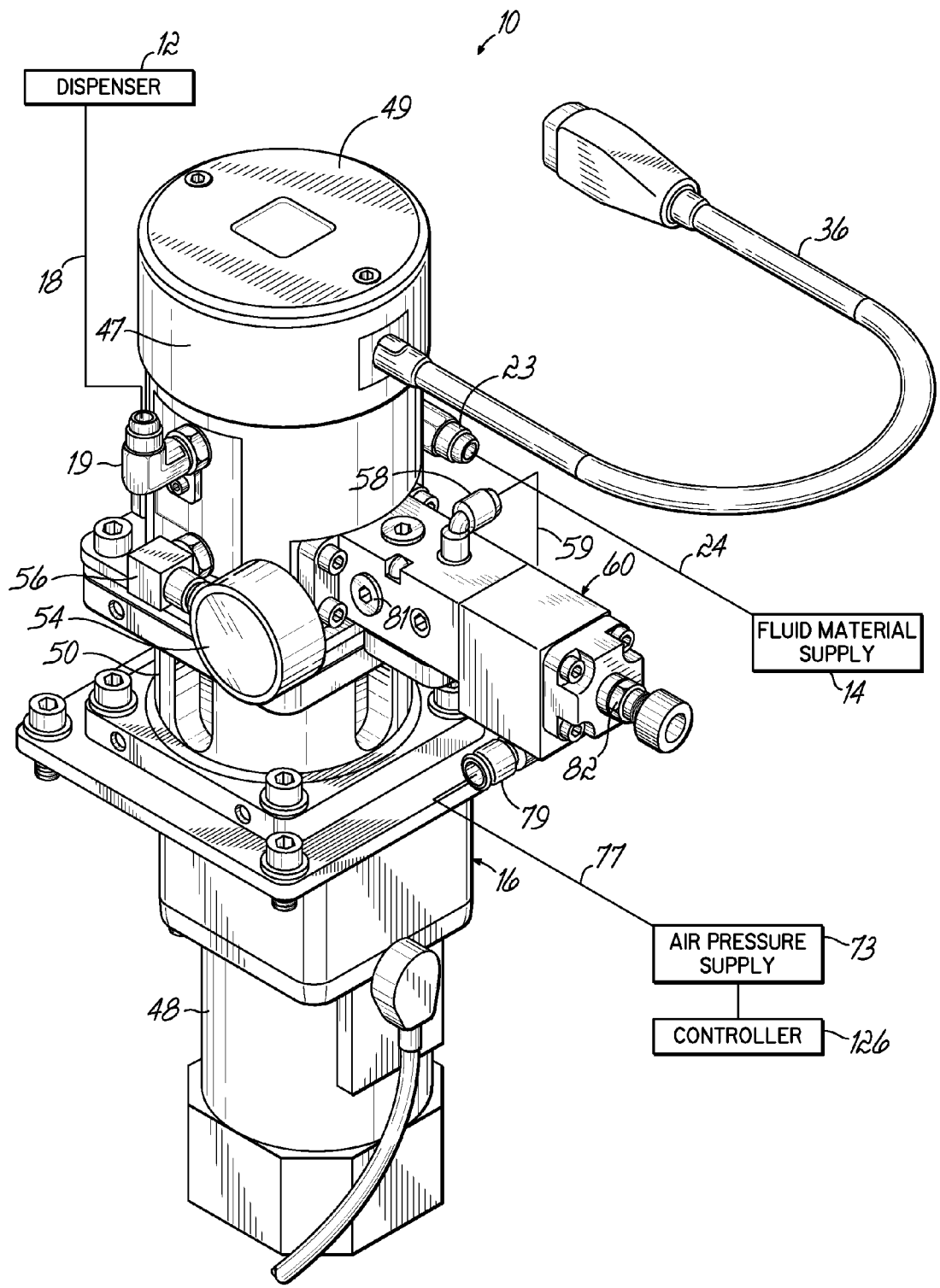
FIG. 1 is a diagrammatic perspective view of an embodiment of a dispensing system for dispensing a mixture of a gas and a fluid material in which the dispensing system includes a mixing device and a gas injection device coupled with the mixing chamber.
Figure 1A:
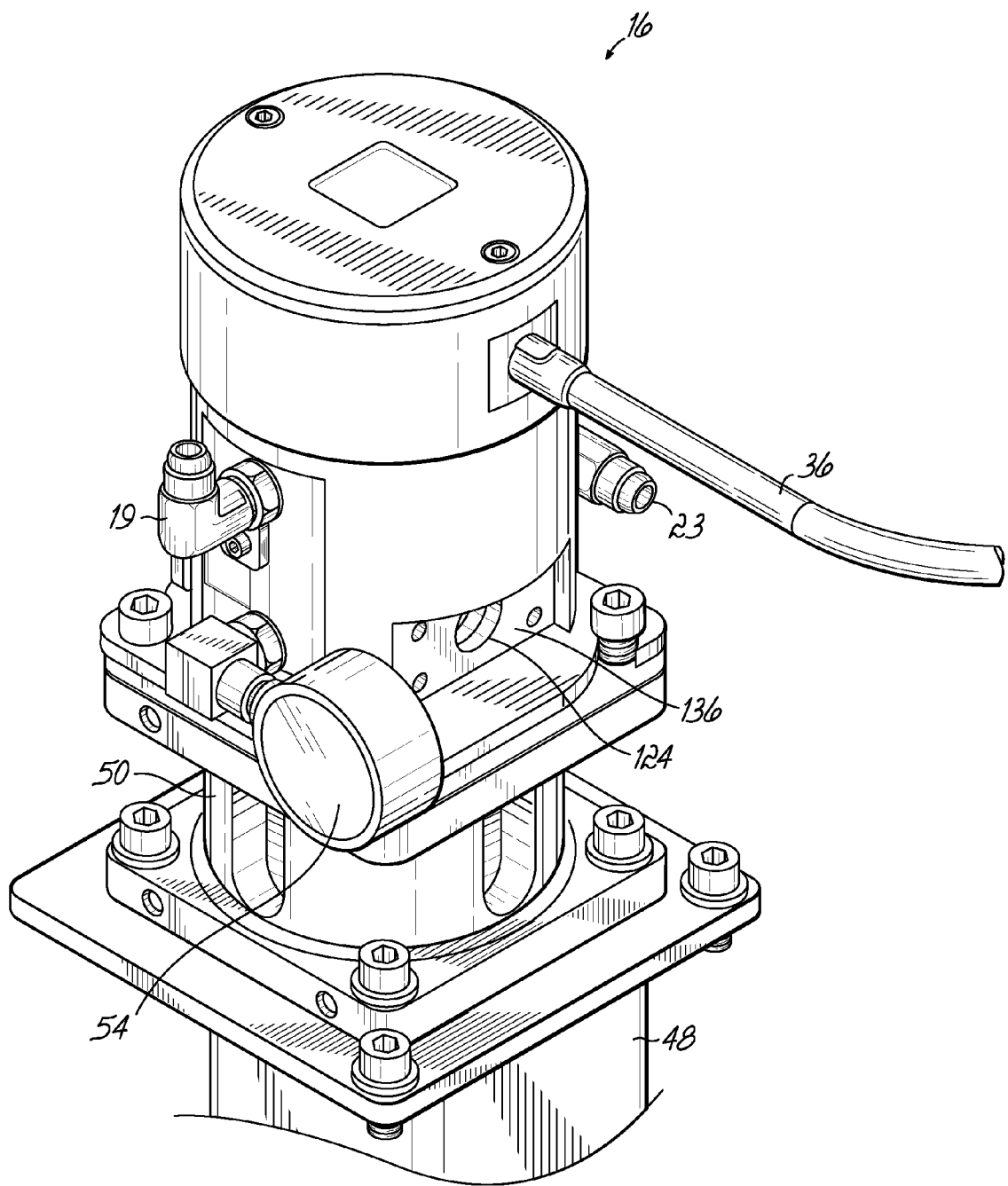
FIG. 1A is a perspective view of a portion of the mixing device of FIG. 1 with the gas injection device detached from the mixing chamber.
Figure 2:
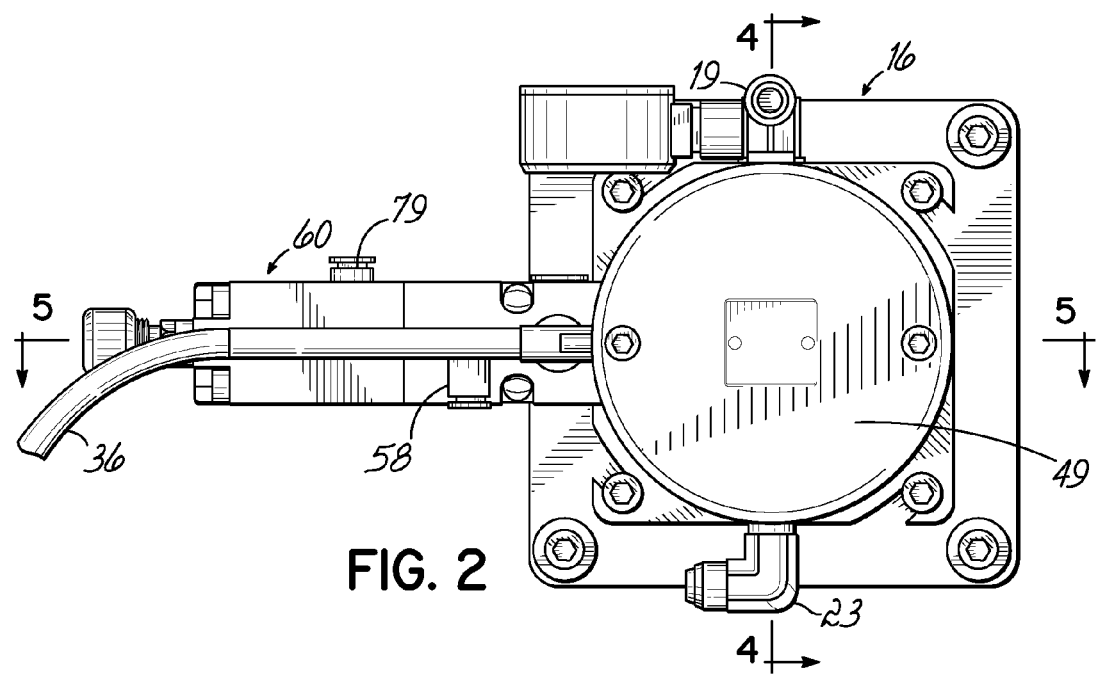
FIG. 2 is a top view of the mixing device of FIG. 1.
Figure 3:
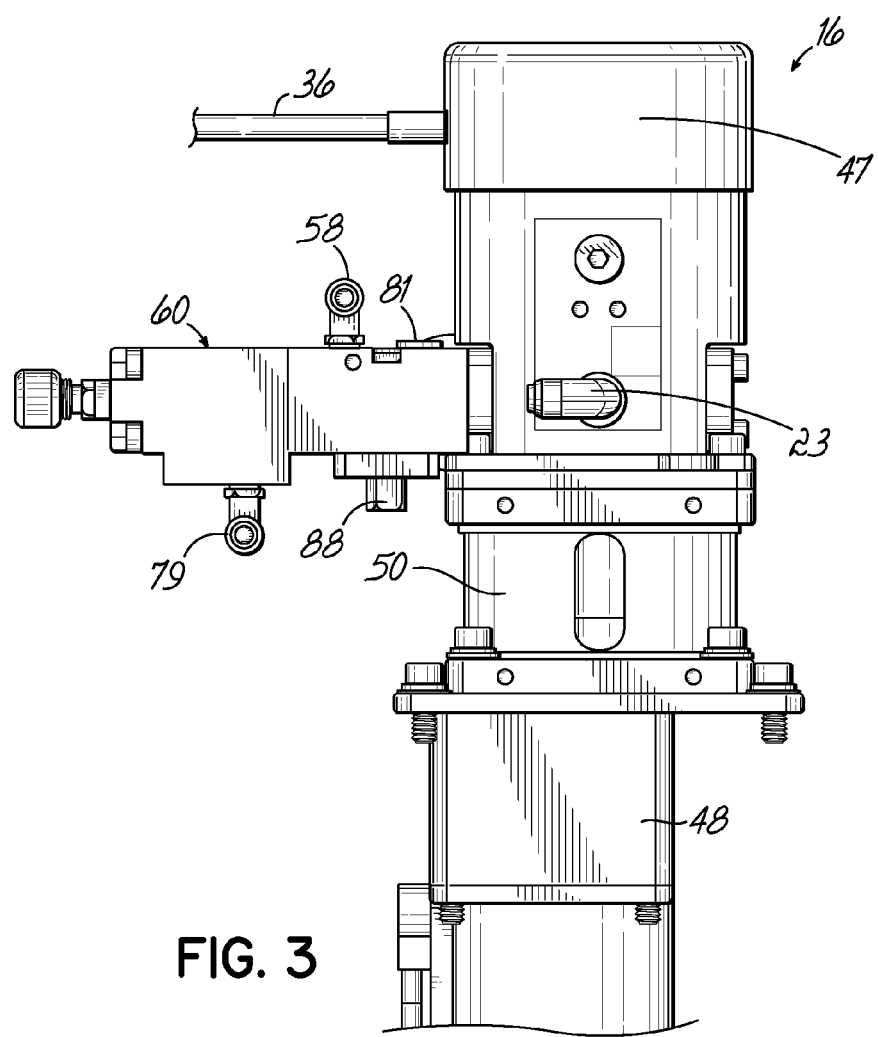
FIG. 3 is a side view of a portion of the mixing device of FIG. 1.
Figure 4:
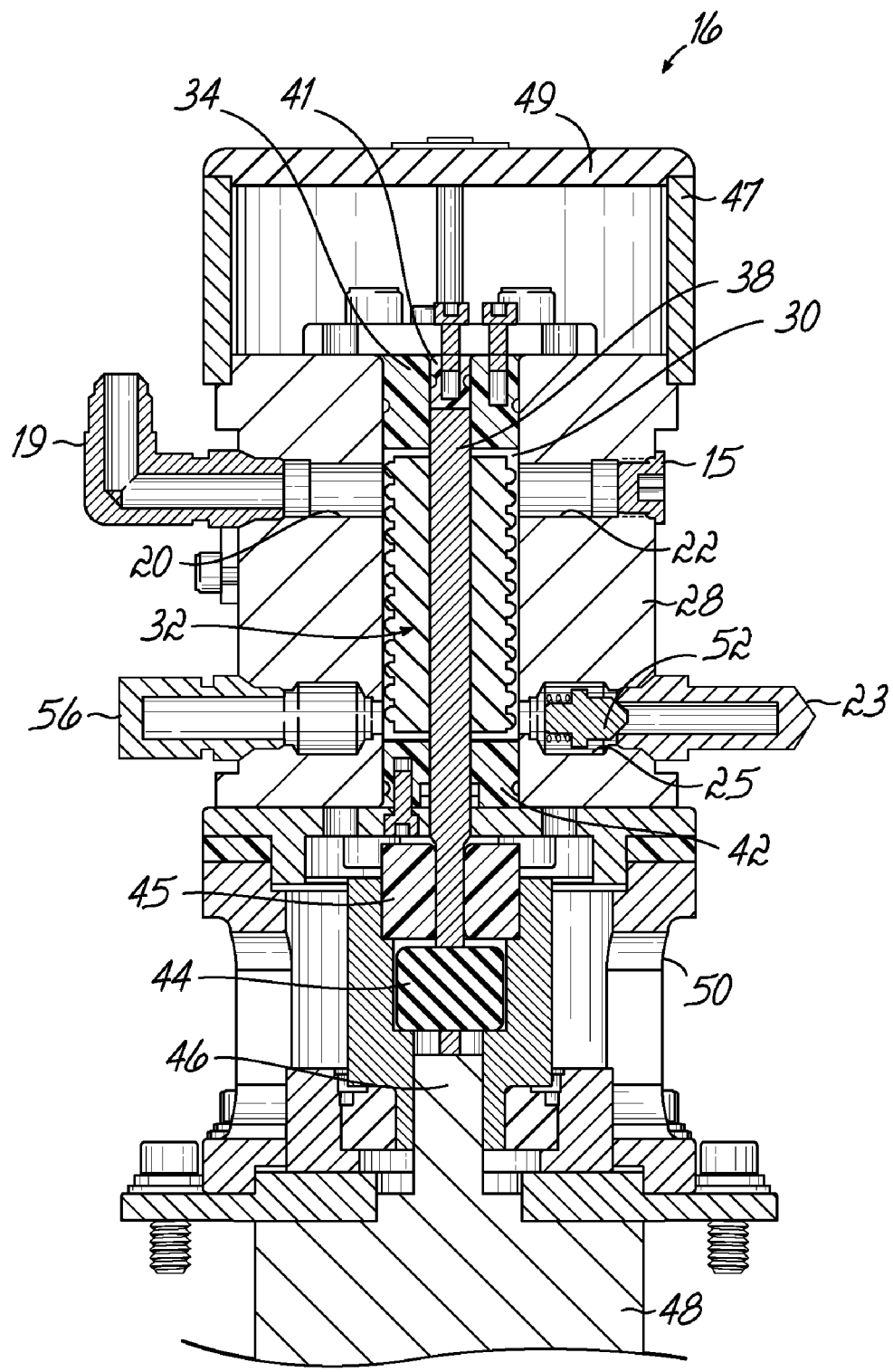
FIG. 4 is a cross-sectional view of the mixing device taken generally along line 4-4 in FIG. 2.
Figure 5:
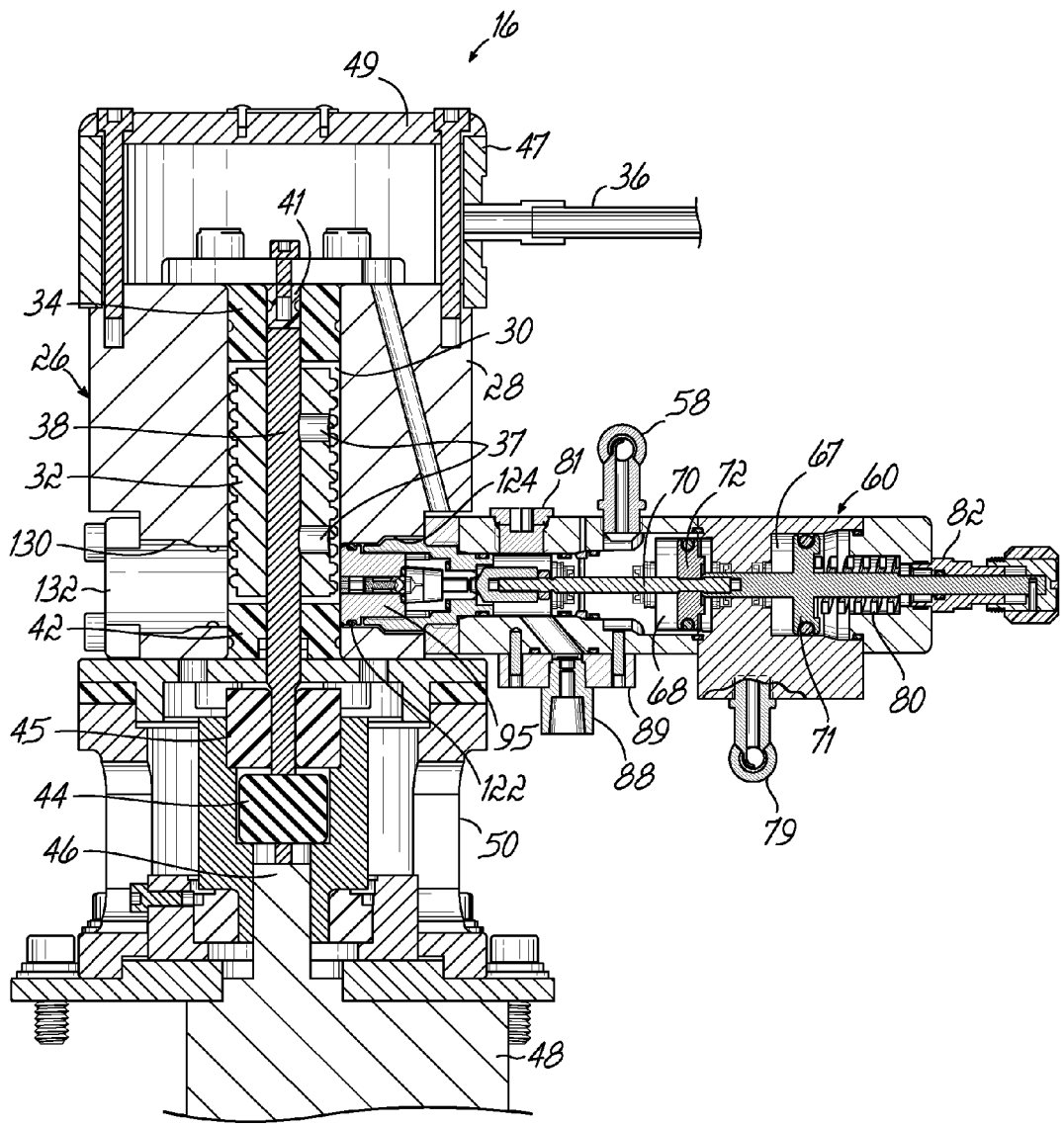
FIG. 5 is a cross-sectional view of the mixing device taken generally along line 5-5 in FIG. 2.

With reference to FIGS. 1, 1A, 2, and 3, a dispensing system 10 is provided for dispensing a foamed fluid material, such as a foamed liquefied or molten hot melt adhesive. Dispensing system 10 includes at least one dispenser 12, a supply 14 of the fluid material, and a mixing device 16 coupling the dispenser 12 and supply 14.

Dispenser 12 is configured in a manner understood by a person having ordinary skill in the art to dispense the foamed fluid material in discrete volumes, such as beads or dots, to provide an interrupted, non-continuous pattern on a moving substrate, or to dispense the foamed fluid material as continuous beads or stripes. The dispenser 12 may comprise a gun, a module, a hand gun, etc. In one specific embodiment, the dispenser 12 may be any conventional hot melt dispenser, including but not limited to needle valve-type dispensers, capable of selectively actuating a valve stem relative to a sealing seat for intermittently discharging amounts of the mixture of gas and fluid material from a discharge orifice and providing a positive flow cutoff. The dispenser 12 may be pneumatically actuated by the operation of a solenoid valve that supplies air pressure to an air cylinder for moving the valve stem away from the sealing seat, thereby allowing the mixture of gas and fluid material to flow to the discharge orifice. Alternatively, the dispenser 12 may be electrically operated and include a coil that generates an electromagnetic field for moving an armature relative to a stationary pole, in which the stem is physically coupled with the armature for moving the valve stem relative to the sealing seat. The discharge orifice of the dispenser 12 may be defined in a nozzle that may be readily removed and exchanged with other similar nozzles for varying the configuration of discharge orifice to dispense amounts, streams, dots or beads of the foamed fluid material characterized by a different size and/or a different shape. The dispenser 12 may also include a trigger that is manually actuated to initiate dispensing.

With reference to FIGS. 1, 1A, and 2-5, the dispenser 12 is coupled in fluid communication with an outlet port 20 from the mixing device 16 by an elbow fitting 19 mounted in the outlet port 20 by, for example, a threaded engagement and a hose 18 connected to the elbow fitting 19. Another module or gun (not shown) may be coupled with another outlet port 22 of the mixing device 16, which is plugged with plug 15 as visible in FIG. 4. The supply 14 is coupled in fluid communication with an inlet port 25 to the mixing device 16 by an elbow fitting 23 mounted in the inlet port 25 by, for example, a threaded engagement and a supply hose 24 connected to the elbow fitting 23. The hoses 18, 24, which include a lumen with opposite open ends having threaded couplings or quick release fittings, are configured to withstand the fluid pressure applied by the pressurized fluid material without rupturing. The hoses 18, 24 may be insulated and/or heated with active heating elements for the purpose of reducing heat loss from heated fluid materials.

Supply 14 may be any source of molten material pumped under pressure appreciated by a person having ordinary skill in the art. The stream of fluid material is forcibly pumped from the supply 14 to the mixing device 16 at a positive fluid pressure, for example in a range of 200 pounds per square inch (psi) to 2000 psi. The supply 14 may comprise a hot melt unit including a heated tank for containing and liquefying a solid or semi-solid polymeric material and a pump for pumping the liquefied polymeric material from the tank. Alternatively, the supply 14 may comprise a drum melter in the form of a shipping container, such as a 55-gallon barrel or drums, a 5-gallon pail, etc., containing a polymeric material, such as a hot melt adhesive, and a heating element inserted into the open end of the shipping container. The heating element liquefies the solid material in the shipping container for pumping in the liquefied state directly from the shipping container to the mixing device 16. The supply 14 may also supply other types of fluid materials including, but not limited to, cold fluid materials (which may be warmed to increase the viscosity as an aid in dispensing), polymeric coatings, paints, other thermoplastic and/or thermosetting materials, and sealants like polyurethane, silicone, and plastisol.

With reference to FIGS. 1, 1A, and 2-6, the mixing device 16 includes a mixing body 26 with a side wall 28, a tubular mixing chamber 30 bound by the side wall 28, and a mixer 32 disposed inside the mixing chamber 30. The mixing device 16 is heated by heaters (not shown), such as cartridge-style resistance heating elements, embedded in bores (not shown) formed in the side wall 28. The heaters are connected by an electrical cable 36 with a suitable temperature controller (not shown) that provides electrical energy for resistive conversion by the heaters into heat energy transferred to mixing body 26 and, subsequently, heat transfer to the fluid material inside the mixing chamber 30. A conventional temperature sensor (not shown), such as a resistance temperature detector (RTD), a thermistor or a thermocouple, may provide a temperature feedback signal for use by the temperature controller in regulating the power provided through the electrical cable 36 to the heaters. The heaters are used to assure that the fluid material is within an acceptable temperature range when it is dispensed from the dispenser 12.

The mixer 32 includes a central shaft 38 extending longitudinally through the mixing chamber 30, a cylindrical body 39 physically engaged with the central shaft 38 by set screws 37 and rigidly coupled for rotation with the central shaft 38, and fins 40 that project outwardly from the cylindrical body 39 toward the confronting inner surface of the side wall 28 of the mixing chamber 30. One end of the central shaft 38 is supported for rotation relative to side wall 28 of mixing body 26 by a bushing or bearing 34 in one open end of the mixing chamber 30. A thrust bearing 41, which fills a hollow central bore of bushing 34, provides a thrust load support for central shaft 38. The bushing 34 and thrust bearing 41 are assembled together and secured to the mixing body 26 with conventional threaded fasteners. The opposite end of the central shaft 38 projects through. The opposite end of the central shaft 38 projects through a bushing 42 situated in the opposite open end of the mixing chamber 30.

The fluid material is bounded inside the mixing chamber 30 in a region between the bushings 34, 42. The bushings 34, 42 include various sealing members that assist in confining the fluid material inside the mixing chamber 30. A cowling 47 and a cap 49 secured by conventional fasteners to the mixing body 26 protectively cover the end of the mixing device 16 opposite to the end coupled with motor 48.

One end of the central shaft 38 projects through a hollow central bore of bushing 42. Another thrust bearing 44 is situated in the opposite open end of the mixing chamber 30 also provides a thrust load support for this end of the central shaft 38. The projecting end of central shaft 38 is coupled by a coupling element 45 with a drive shaft 46 of a motor 48. The coupling element 45, as well as the thrust bearing 44, may be formed from a material having a low thermal conductivity so that heat transfer is reduced from the mixing body 26 to the motor 48, which has a conventional construction understood by a person having ordinary skill in the art. A standoff 50 separates the motor 48 from the mixing body 26 so as to thermally isolate the motor 48 from the mixing body 26. The standoff 50 includes slots that promote cooling. The motor 48, which may include a gear box or another type of drive transmission, drives the powered rotation of the coupled shafts 38, 46 for moving the fins 40 relative to the side wall 28 of the mixing chamber 30.

Alternatively, the mixer 32 may be any other type of dynamic mixer or a conventional static mixer as recognized by a person of ordinary skill in the art that is compatible with installation in the mixing chamber 30. Conventional static mixers, which have no moving parts, are devices having a series of internal baffles or elements, such as a series of alternating right- and left-handed helical elements oriented at right angles to one another. Representative static mixers are disclosed in commonly-assigned U.S. Pat. No. 5,480,589, the disclosure of which is incorporated by reference herein in its entirety. Representative dynamic mixers are disclosed in commonly-assigned U.S. Pat. No. 4,778,631, the disclosure of which is incorporated by reference herein in its entirety.

Figure 6:
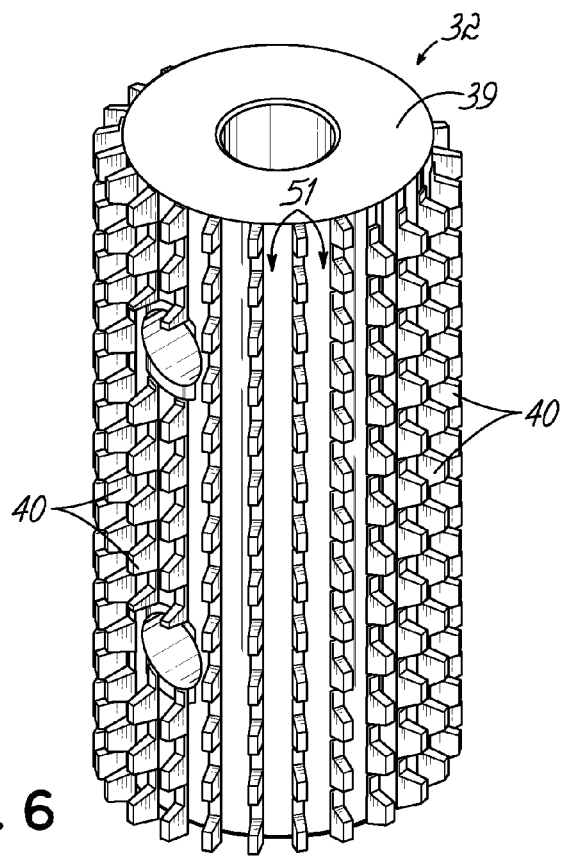
FIG. 6 is a perspective view of the mixer used in the mixing device of FIG. 1.

As best shown in FIG. 6, the rows of fins 40 on the mixer 32 are distributed along the length of the cylindrical body 39 (and the length of the central shaft 38) and adjacent rows of fins 40 are separated by a flow channel 51. Rotation of the fins 40 relative to the stationary side wall 28 operates to homogeneously blend or mix gas introduced under pressure into the mixing chamber 30, as described below, with the pressured fluid material inside the mixing chamber 30. The pressurized fluid material is continuously supplied from the supply 14 to the inlet port 25, flows through the mixing chamber 30, and exits through the outlet port 20. The tip of each fin 40 has a close clearance with the side wall 28. The fluid material and gas are forced through the gaps between adjacent fins 40, as the fins 40 rotate, for mixing, stirring and agitating the gas and fluid material.

The fins 40, which are fashioned from an initially continuous helical thread extending along the length of the body 39, have a helical arrangement likewise winding along the length of the body 39. As the central shaft 38 of mixer 32 is continuously rotated by operation of motor 48, the helical arrangement of the fins 40 tends to force the fluid material toward the inlet port 25, which retards the forward flow of the mixture toward the outlet port 20. The fluid material flowing through the mixing chamber 30 and the incoming pressurized gas are therefore repeatedly divided by the fins 40 into minor streams and then recombined, thus creating a substantially homogeneous blend or mixture.

A flow control element in the representative form of a spring-loaded check valve 52 (FIG. 4) is located in the inlet port 25 between the mixing chamber 30 and the supply 14. The check valve 52, which has a conventional construction, prevents gas-filled fluid material from infiltrating into the supply hose 24 and being transported upstream to the supply 14.

A pressure gauge 54 communicates with the mixing chamber 30 for sensing and measuring the pressure of the fluid material flowing through the mixing body 26. The pressure gauge 54 has a pressure indicator, such as a dial, visible from the exterior of the mixing device 16 for indicating the measured pressure. The pressure gauge 54 is located at one end of an elbow connector 56 coupled by, for example, a threaded engagement with a port in the mixing body 26 communicating with the mixing chamber 30. An observer can view the readout on the pressure gauge 54 to, for example, adjust an operational parameter of the mixing device 16. Typically, the pressure of the gas being introduced into the mixing chamber 30 is maintained at approximately 100 psi to approximately 400 psi greater than the pressure of the fluid material inside the mixing chamber 30. Generally, the gas pressure will depend on the viscosity and flow rate of the fluid material.

With reference to FIGS. 1, 5, 7, 7A, 8, and 9, an injection device 60 is used to inject a metered stream of pressurized gas into the mixing chamber 30. The injection device 60 includes a main body 62 that projects from the mixing body 26, a bore 65 inside the main body 62 leading to a gas outlet 66 in a nozzle 95, and a pair of actuator cavities or chambers 67, 68 at an opposite end of the main body 62. The main body 62 may be formed from multiple components that are assembled together with appropriate sealing members and fasteners.

A valve stem or needle 70 is coupled at one end with a piston 71 disposed inside actuator chamber 67 and a piston 72 disposed inside the actuator chamber 68. An opposite end of the needle 70 carries a needle tip 74, which is disposed in a gas chamber 64 defined inside the bore 65. The needle tip 74 may have a secure threaded connection with the end of the needle 70. The leading end of the needle tip 74 is shaped to contact and engage a line of contact on a sealing seat 76, which is also disposed in the bore 65, when the injection device 60 is closed. The sealing seat 76 is carried on tubular portion 75 of an inlet screen assembly 92, which is located inside the bore 65 of the main body 62, carries. A sealing ring 127 is disposed in a ring-shaped groove to supply a seal between the main body 62 and the tubular portion 75 of inlet screen assembly 92.

Figure 8:
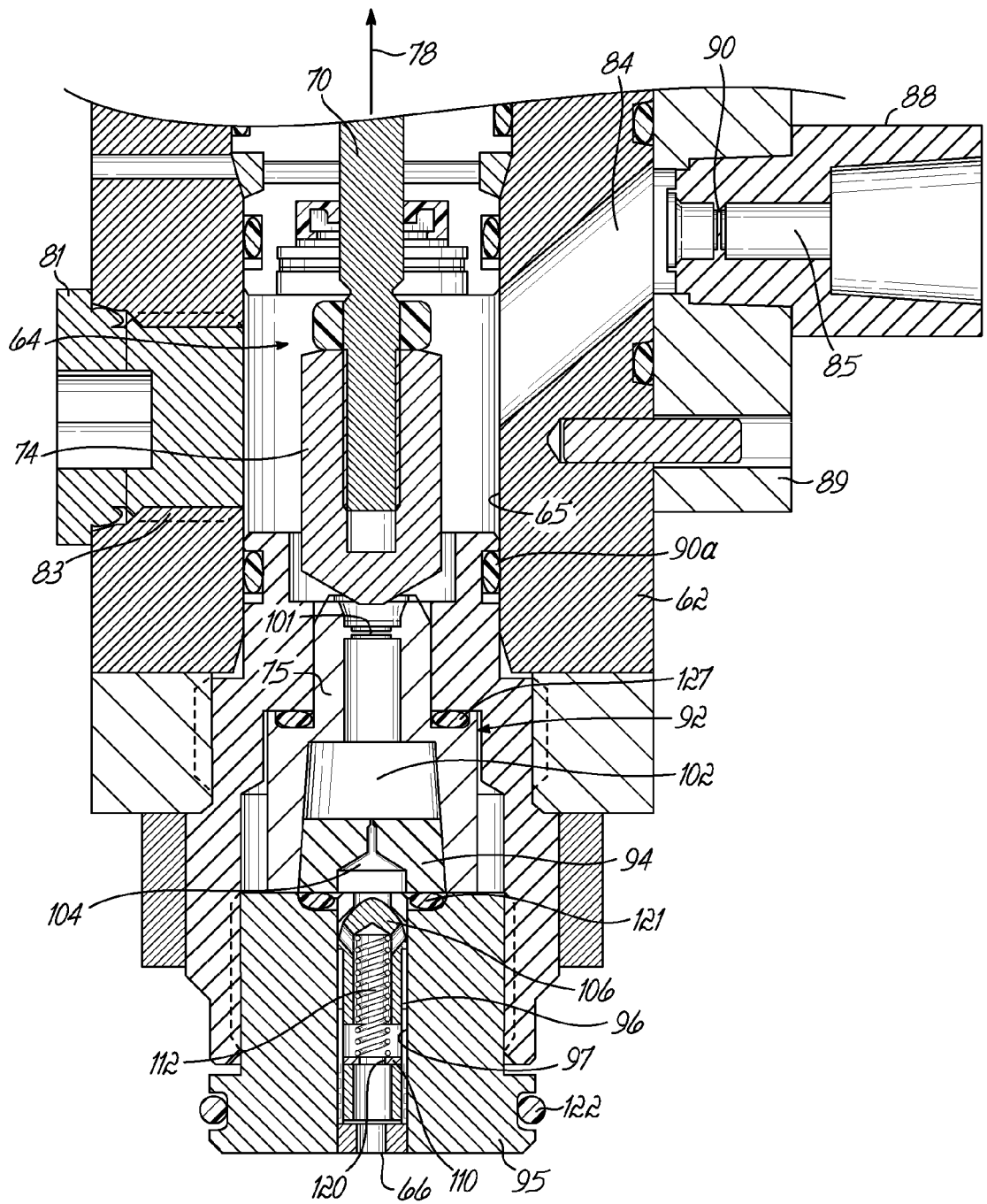
FIG. 8 is an enlarged cross-sectional view of a lower portion of the gas injection device of FIG. 7A.
Figure 9:
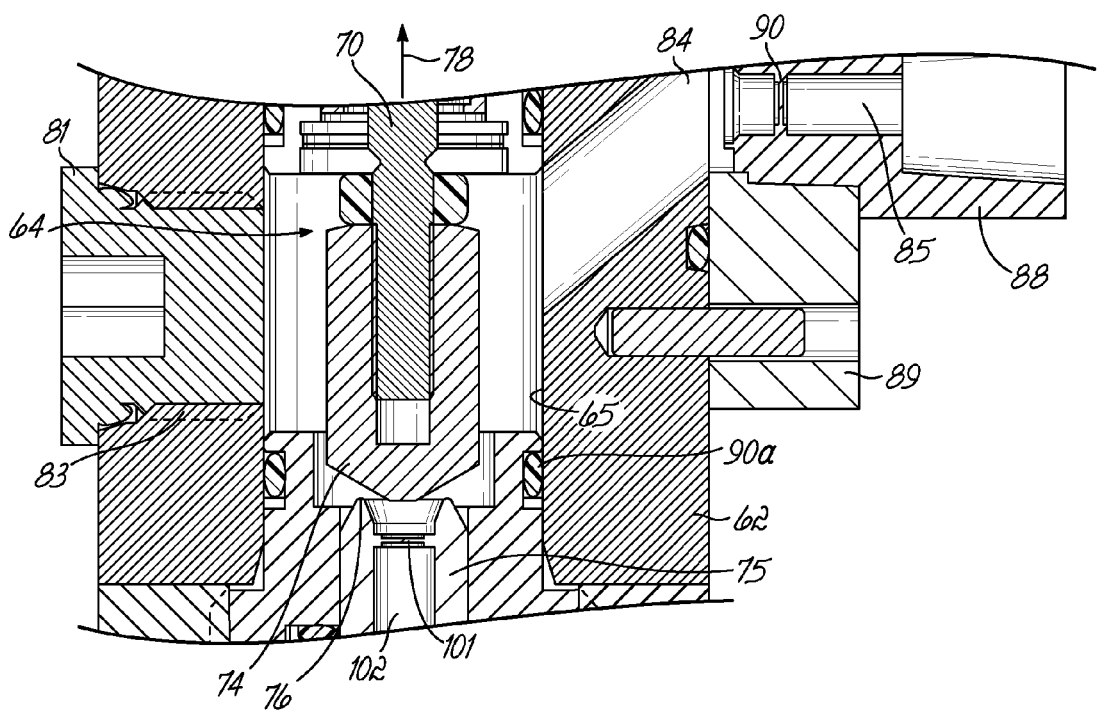
FIG. 9 is an enlarged cross-sectional view of a portion of FIG. 8.
Figure 10:
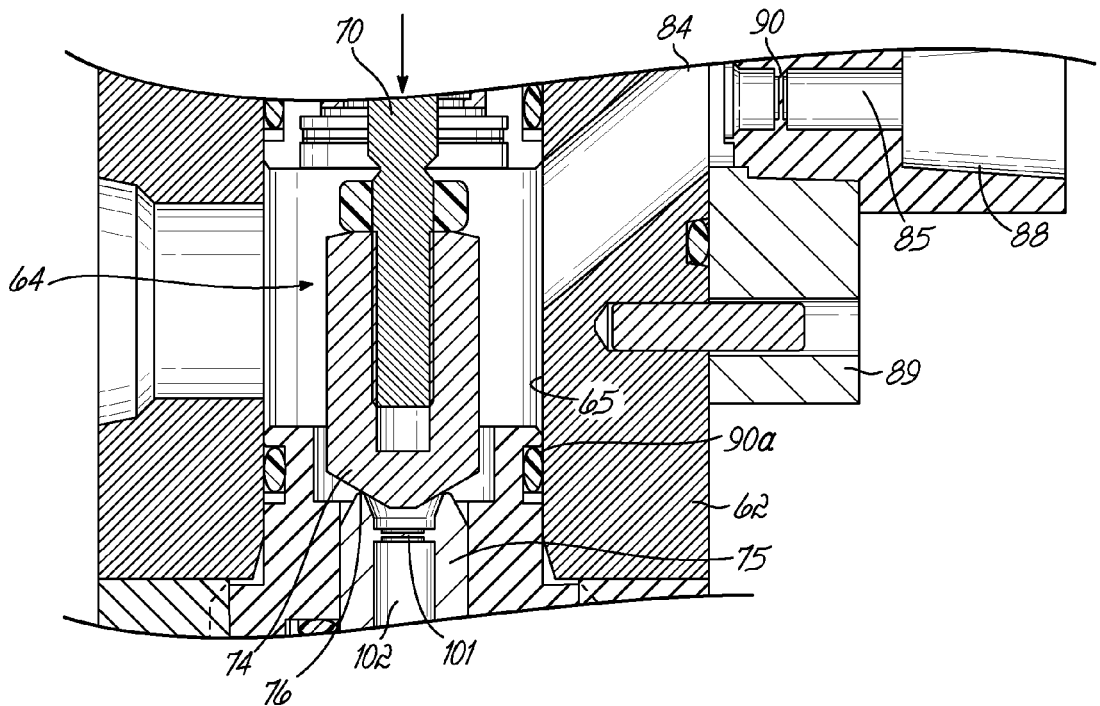
FIG. 10 is a cross-sectional view similar to FIG. 10 in which the needle tip is in contact with the sealing seat.

The needle 70 and needle tip 74 are configured to be reciprocated axially by movement of the pistons 71, 72 for shifting the needle tip 74 into and out of contact with the sealing seat 76 to place the injection device 60 in the closed condition, as best shown in FIG. 10, and an opened condition, as best shown in FIGS. 8 and 9. When the needle tip 74 is in contact with the sealing seat 76, gas is prohibited from flowing from gas chamber 64 past the sealing seat 76 and fluid material is prohibited from flow in the opposite direction past the sealing seat 76. The needle tip 74 may be formed from a compliant material, such as a polyimide, that yields and compresses slightly when forcibly contacting the sealing seat 76, which may be made from a metal like stainless steel. Alternatively, the needle tip 74 may also be made from a metal, such as stainless steel, if lapped in tandem with the sealing seat 76.

An air pressure supply 73 is coupled by a hose 77 with an inlet of a tee fitting 79, which has a central stem coupled by, for example, a threaded engagement with a port extending through the main body 62 of the injection device 60 to the actuator chamber 67. An outlet of the tee fitting 79 is coupled by a jumper hose 59 with an elbow fitting 58 having a stem coupled by, for example, a threaded engagement with a port extending through the main body 62 of the injection device 60 to the actuator chamber 68. The air pressure supply 73 is coupled with the actuator chambers 67, 68 for simultaneously pressurizing the actuator chambers 67, 68 and simultaneously exhausting air pressure from the actuator chambers 67, 68. The air pressure supply 73 may include a solenoid for switching the supply of pressurized air to the actuator chambers 67, 68 and the exhaust of pressurized air from the actuator chambers 67, 68. The solenoid of the air pressure supply 73 is electrically coupled with the controller 126 for regulating the supply of air pressure to the actuator chambers 67, 68.

Figure 7:
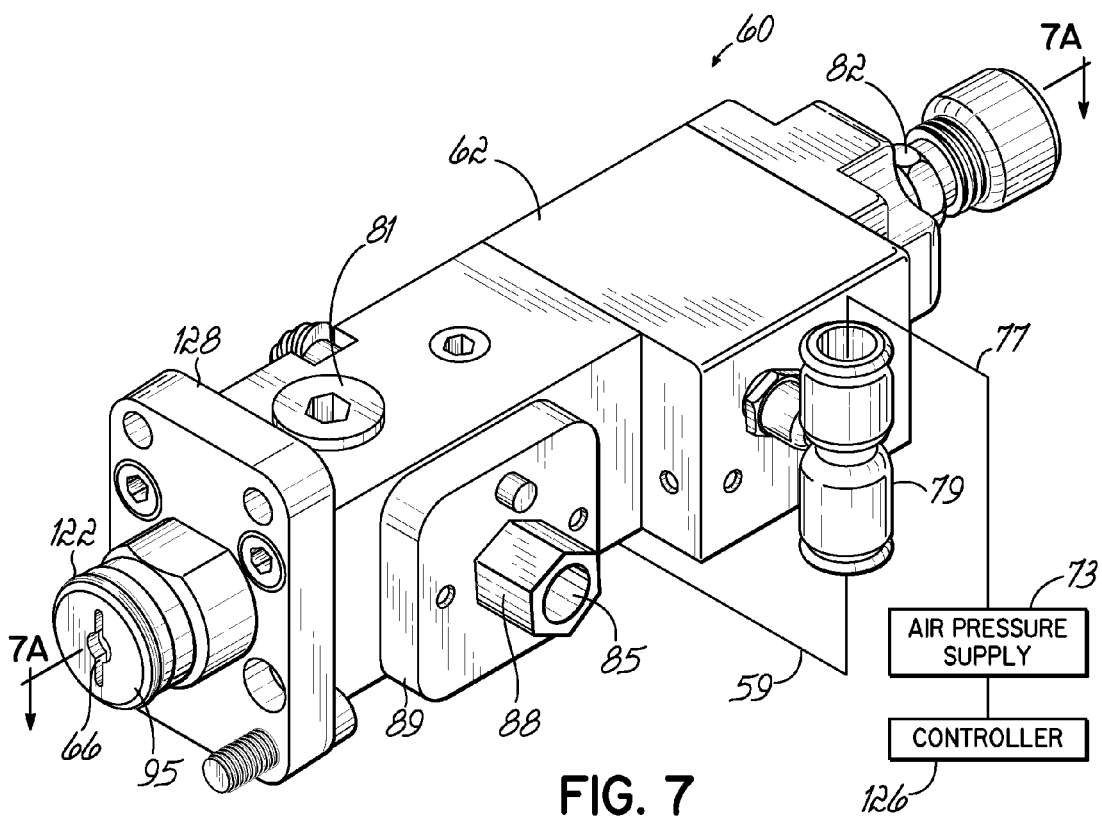
FIG. 7 is a perspective view of the gas injection device of FIG. 1 illustrated as detached from the mixing chamber of the dispensing system.
Figure 7A:
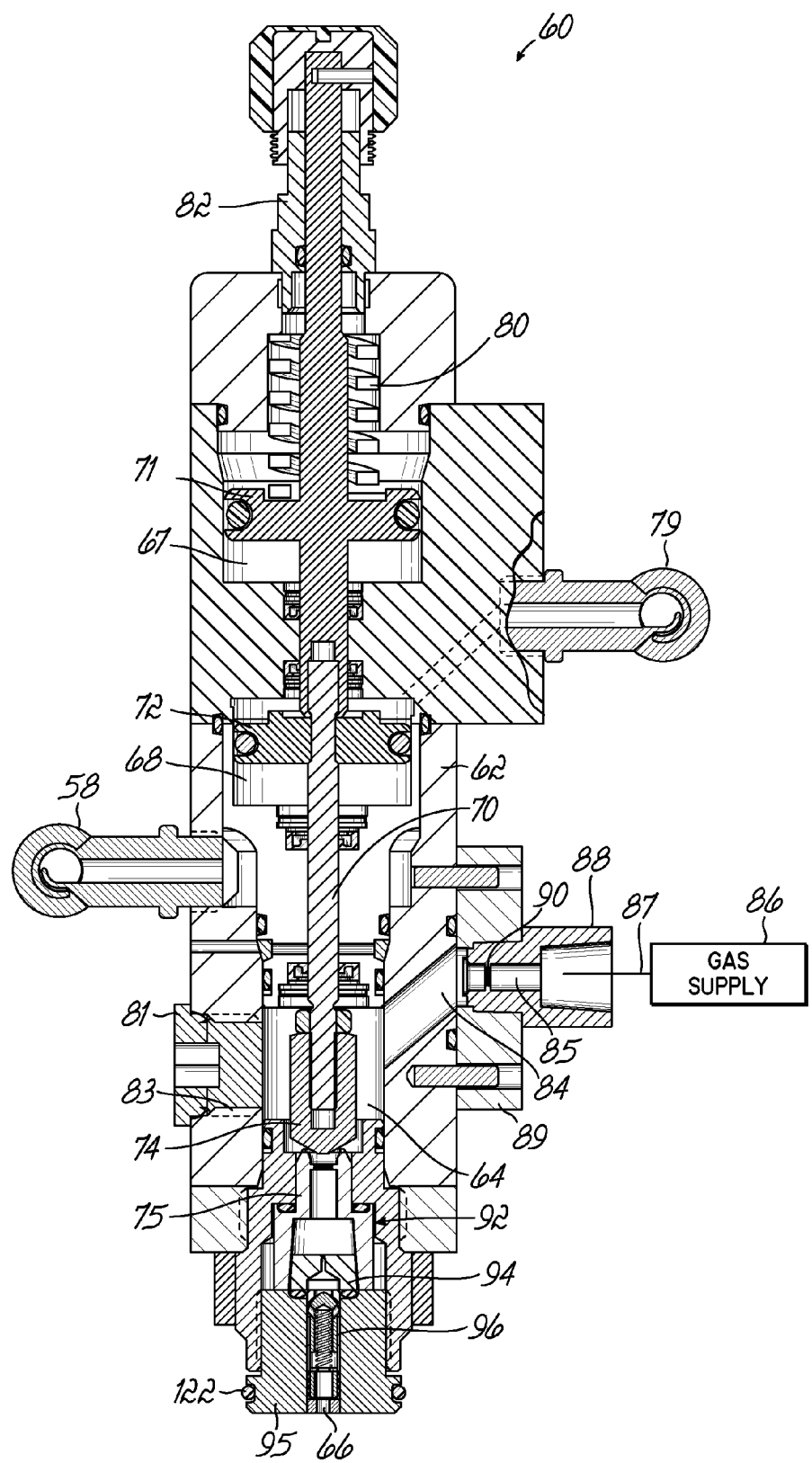
FIG. 7A is a cross-sectional view taken generally along line 7A-7A in FIG. 7 in which the needle tip of the gas injection device is shown separated from the sealing seat for injecting gas into the fluid material inside a mixing chamber of the mixing device.

The pistons 71, 72 are pneumatically moved relative to the main body 62 when sufficient air pressure is introduced into the respective actuator chambers 67, 68 on a side of the pistons 71, 72 that is nearest to the needle tip 74. The pistons 71, 72, each of which carries a sealing ring that provides a sealed contact with the inner surface of the respective one of the actuator chambers 67, 68 moves the needle 70 in a direction 78 that separates the needle tip 74 from the sealing seat 76 and compresses a spring return mechanism 80 (FIG. 7A). When the needle tip 74 is separated from the sealing seat 76 in an opened condition, gas is permitted to flow past the sealing seat 76. When the air pressure in the actuator chambers 67, 68 is simultaneously relieved, the spring return mechanism 80 automatically shifts the needle 70 opposite to direction 78 and toward the gas outlet 66 until the needle tip 74 contacts the sealing seat 76 to re-establish the closed position. A stroke adjustment mechanism 82 (FIG. 7A) is provided that can be rotated clockwise or counterclockwise to the amount of travel of the needle 70.

The air-open and spring return actuator for needle 70 may be replaced by an air-open and air-closed actuator. In this alternative embodiment, the spring return mechanism 80 may be eliminated and replaced by air pressure applied in actuator chambers 67, 68 on the opposite side of the respective pistons 71, 72 for moving the piston 72 and the needle 70 in a direction opposite to direction 78 to close the injection device 60 and shut off the gas flow. In other alternative embodiments, the needle 70 may be electrically actuated, moved by a rotary drive, or moved by magnets, as opposed to being pneumatically driven.

An inlet 84 for supplying gas to the injection device 60 penetrates through the peripheral wall of the main body 62 to communicate with the gas chamber 64. The needle tip 74 is disposed in the gas chamber 64. The main body 62 has another unused inlet 83 communicating with the bore 65 that is blocked and sealed by a removable plug 81. A gas supply 86 is coupled by a hose 87 with an inlet passage 85 in an inlet fixture 88 communicating with the inlet 84 to the injection device 60. Gas supply 86 supplies a pressurized flow of a gas, such as an inert gas like nitrogen or carbon dioxide, or shop air optionally dehumidified to have a reduced water vapor content, that is injected by the injection device 60 into the fluid material inside the mixing chamber 30.

The inlet fixture 88 is secured to the main body 62 using a mounting ring 89 and conventional fasteners. A filter screen 90, which is disposed in the inlet passage 85 of the inlet fixture 88, removes particles from the arriving gas before the flow enters the inlet 84 and is supplied to the injection device 60. A suitable sealing ring 90a may be supplied between the main body 62 and the mounting ring 89 at the junction of the inlet 84 and inlet passage 85 to prevent gas from escaping between the main body 62 and the inlet fixture 88.

Figure 11:
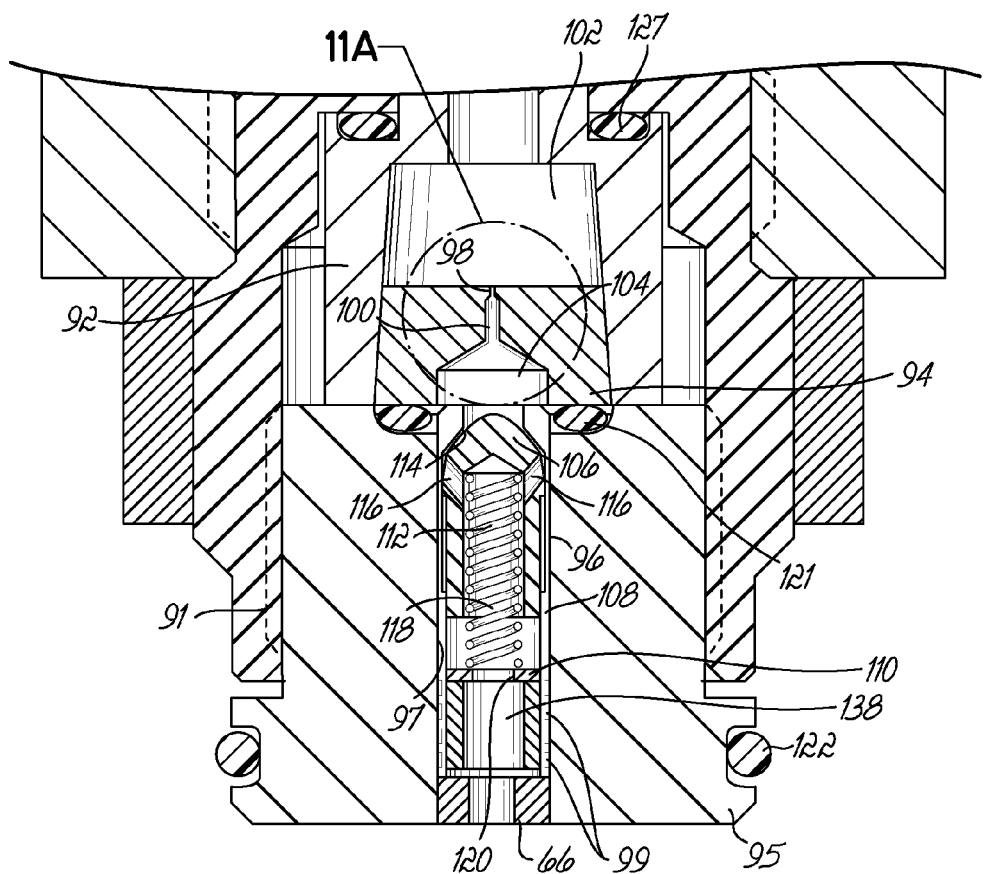
FIG. 11 is an enlarged cross-sectional view of a different portion of FIG. 7A.
Figure 11A:
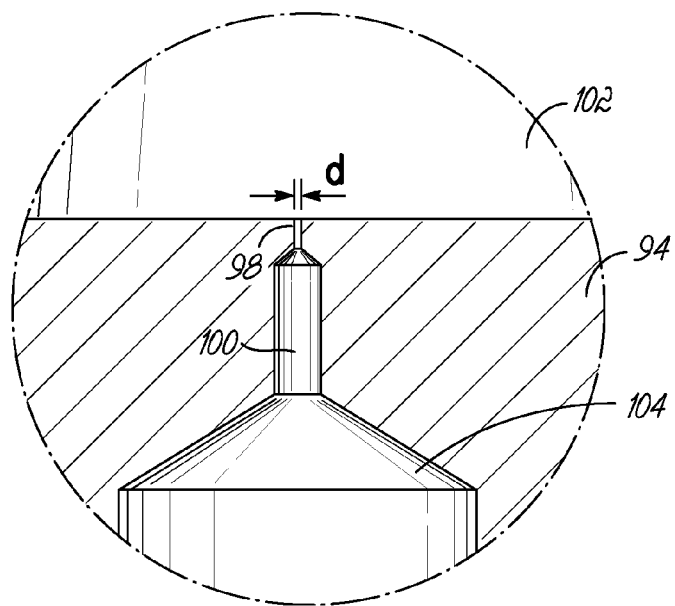
FIG. 11A is an enlarged cross-sectional view of a portion of FIG. 11.

With reference to FIGS. 11 and 11A, the injection device 60 includes the inlet screen assembly 92, an orifice button 94, and a mechanical check valve 96 that are disposed in a portion of the bore 65 between the sealing seat 76 and gas outlet 66. The orifice button 94 is disposed between the inlet screen assembly 92 and the check valve 96. A control orifice 98 and a passageway 100 with a substantially larger cross-sectional area than control orifice 98 extend through the orifice button 94 to define a portion of the gas passage through the injection device 60. The inlet screen assembly 92 includes a filter screen 101 positioned upstream of the control orifice 98 and between the control orifice 98 and the sealing seat 76.

When the needle tip 74 is separated from the sealing seat 76, gas flows into a gas chamber 102 defined in the inlet screen assembly 92, through the control orifice 98, and into another gas chamber 104 defined between the inlet screen assembly 92 and a seat 114 of the check valve 96. Gas chamber 102 includes two connected regions of different inner diameter of which passageway 100, of smaller inner diameter, is coupled directly with the control orifice 98. The control orifice 98 meters the flow of gas from gas chamber 102 to gas chamber 104. The control orifice 98 may have an effective diameter, d, in the range of about 0.001 inches (about 0.00254 centimeter) to about 0.002 inches (about 0.00508 centimeter), or any other diameter effective for metering the flow of gas. The control orifice 98 has an effective inner diameter that is significantly smaller than the inner diameter of the passageway 100. The control orifice 98 is upstream from the gas chamber 104 and downstream from the sealing seat 76 and gas chamber 102. The gas chambers 102, 104 and control orifice 98 effective define a contiguous gas-filled space between the sealing seat 76 and the seat 114.

The filter screens 90, 101 have a screen size effective to retain particles having dimensions greater than the effective diameter, d, of the control orifice 98, which operates to reduce the risk of clogging. For example, the filter screens 90, 101 may have a screen size of about 10 microns (0.0004 inches) to about 15 microns (0.0006 inches) for use with a control orifice 98 having an effective diameter of about 0.001 inches (about 0.00254 centimeter).

The check valve 96 is disposed inside a central bore 97 of nozzle 95. The check valve 96 includes a plunger 106, a body 108, a spring retainer washer 110, and a biasing element in the representative form of a compression spring 112 with coils compressed between the plunger 106 and the spring retainer washer 110. The exterior of the body 108 of check valve 96 includes a series of annular ring features 99 that are configured to secure the check valve 96 within the central bore 97 in a sealed engagement and at a fixed location.

When the check valve 96 is closed, the head of the plunger 106 contacts the seat 114, which is defined by an annular edge encircling inwardly-curved end section of the body 108. When seated, the head of the plunger 106 projects into the nearby cylindrical portion of the gas chamber 104. The plunger 106 of the check valve 96 includes a lower skirt with ports 116 that direct gas passing from the cylindrical section of gas chamber 104 between the plunger 106 and seat 114 into a space 118 inside the body 108 in which the compression spring 112 is confined. When the fluid material is displaced out of space 118 into the mixing chamber 30, space 118 comprises a gas passage that is coupled by a clearance opening 120 in the spring retainer washer 110 and another passageway 138 inside body 108 with the gas outlet 66.

When the injection device 60 is operating and closed, fluid material is normally present inside the space 118. However, when the injection device 60 is opening, opened, or transitioning from opened to closed such that the plunger 106 has a non-contacting relationship with seat 114, the fluid pressure of the gas in the gas chamber 104 keeps the fluid material in space 118 from passing the seat 114 and entering the gas chamber 104. Hence, the check valve 96 keeps fluid material in the mixing chamber 30 from infiltrating into the injection device 60 and reaching the control orifice 98, which protects the control orifice 98 against contamination by the fluid material.

The nozzle 95 has a threaded coupling, generally indicated by reference numeral 91, with the main body 62. A sealing ring 121 is disposed in a ring-shaped groove to supply a fluid seal between the nozzle 95 and the orifice button 94. The nozzle 95 includes a sealing ring 122 that establishes a sealed engagement with an inlet opening 124 (FIGS. 1A, 5) penetrating through the side wall 28 of the mixing body 26 of mixing device 16. Pressurized gas exhausted from the gas outlet 66 enters the mixing chamber 30 inside the mixing body 26 through the inlet opening 124.

A mounting flange 128 is fastened with conventional threaded fasteners (e.g., cap screws) to the main body 62 of injection device 60. The mounting flange 128, in turn, is fastened with conventional threaded fasteners (e.g., cap screws) to the mixing body 26 at a substantially flat fastening area 136 (FIG. 1A) defined in the side wall 28, which mechanically couples the injection device 60 with the mixing device 16.

A control system in the representative form of a controller 126 is electrically coupled with the solenoid of the air pressure supply 73 for the actuator chambers 67, 68 and with the actuator for the dispenser 12. The controller 126 is configured to switch the solenoid of the air pressure supply 73 in coordination with operation of the dispenser 12. In this manner, the gas is introduced from the injection device 60 into the mixing chamber 30 only when the mixture of gas and fluid material is dispensed from the dispenser 12. When the mixture of gas and fluid material is being dispensed, the controller 126 ensures that gas is continuously introduced by the injection device 60 into the mixing chamber 30, when fluid material is continuously flowing through the mixing chamber 30. The mixture of gas and fluid material is ultimately directed through outlet port 20 and hose 18 to the dispenser 12. When fluid material is not flowing through the mixing chamber 30, the injection device 60 is closed so that gas is not unnecessarily introduced into the static fluid material in the mixing chamber 30. In this manner, the flow of gas is regulated so that excess gas is not introduced into any static volume of fluid material residing in the mixing chamber 30.

The controller 126 may be a programmable logic controller (PLC), a digital signal processor (DSP), or another microprocessor-based controller with a central processing unit (CPU) capable of executing software stored in a memory and carrying out the functions described herein, as will be understood by those of ordinary skill. The controller 126 may include a human machine interface (HMI) device with output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the CPU of controller 126.

When triggered for operation, the dispenser 12 may provide an electrical signal to the controller 126. Alternatively, the controller 126 may also control the operation of the dispenser 12 for dispensing the gas/fluid material mixture, or may communicate with another controller (not shown) that controls the operation of the dispenser 12. Alternatively, the controller 126 may also be coupled with a sensor (not shown) monitoring the pressure or flow of the gas being supplied from the injection device 60 into the fluid material flowing in the mixing chamber 30 and use the monitored pressure, as well as a measured flow rate of the fluid material, to dynamically regulate the injection of gas into the fluid material. The controller 126 may be coupled with a sensor detecting the gas content of the dispensed material.

The dispensing system 10 includes additional components such as fasteners, bearings, sealing members, hoses, wiring, etc. (some of which are shown in the Figures but not specifically described) that are necessary for assembling an operational system for generating and dispensing the mixture of gas and fluid material. The construction and placement of these conventional components are understood by a person having ordinary skill in the art.

In use and with reference to FIGS. 1, 1A, 2-7, 7A, 8-11, and 11A, pressurized gas, such as nitrogen, carbon dioxide, or shop air, is supplied from gas supply 86 to the inlet 84 penetrating through the main body 62. When the dispenser 12 is triggered, the controller 126 causes the air pressure supply 73 to pressurize the actuator chambers 67, 68 with air pressure sufficient to move the pistons 71, 72 and needle 70 in direction 78 to separate the needle tip 74 from the sealing seat 76. When the needle tip 74 is separated from the sealing seat 76 in the opened condition, fresh gas is continuously supplied from the gas supply 86 to replace the gas injected through the outlet 66 into the mixing chamber 30. Specifically, fresh gas flows through the inlet 84 and inlet passage 85 into the gas chamber 64, from the gas chamber 64 past the sealing seat 76 into the inlet screen assembly 92, through the control orifice 98 and passageway 100 of the orifice button 94 and into the gas chamber 102 in the inlet screen assembly 92 and then into the gas chamber 104, from the gas chamber 104 past seat 114 of check valve 96 and into space 118.

The combination of fluid pressure of the fluid material inside the mixing chamber 30 and the biasing force from the compression spring 112 applied to the plunger 106 cooperate to maintain the plunger 106 in a contacting relationship with the seat 114 on the body 108 of the check valve 96. The pressurized gas is held inside the gas chamber 104 until the gas pressure reaches a pressure sufficient to overcome the opposing forces applied to the plunger 106 by the fluid pressure applied by the fluid material and the biasing force applied by the compression spring 112. When this threshold gas pressure is achieved inside gas chamber 104, the plunger 106 separates from the seat 114 and gas flows through the seat 114, through ports 116, into space 118 inside the body 108, through the clearance opening 120 in the spring retainer washer 110, and ultimately to the gas outlet 66.

The rate at which gas flows from the seat 114 to the gas outlet 66 is metered primarily by the dimensions of the control orifice 98, which presents the region of lowest conductance. The gas flow rate discharged from the gas outlet 66 is chosen to match the flow rate of fluid material through the mixing chamber 30 and to reflect the desired amount of gas to be introduced into the fluid material to provide the desired density reduction for the mixture of gas and fluid material discharged from the dispenser 12 (FIG. 1). The flow rate may be modified by replacing the orifice button 94 with a different orifice button (not shown) having a control orifice with a different cross-sectional area (i.e., different dimensions) and/or by changing the pressure of the gas supplied from the gas supply 86 to the injection device 60.

The interface between the fluid material and the gas in the vicinity of the seat 114 is believed to be located at or near the line of contact between the plunger 106 and seat 114. Movement of the plunger 106 at the moment of lift off from seat 114 should be controlled to not exceed the minimum separation required to permit the passage of gas. Movement of the plunger 106 in excess of this minimum separation may permit an exchange of gas and fluid material across the seat 114 that allows fluid material to enter the gas chamber 104 and ultimately to contaminate the control orifice 98.

Control over initiating and ending the flow of gas to the mixing chamber 30 may be optimized by minimizing the collective volume of the gas chambers 102, 104. In particular, this volume at least partially determines the response time of the injection device 60 for initiating and end the gas flow to mixing chamber 30. In one embodiment of the invention, the volume of the gas chambers 102, 104 is about 1 cubic centimeter or less.

The pressurized gas is incorporated into the pressurized fluid material inside the mixing chamber 30 as compressed bubbles defined by gas-filled voids. The pressure applied by the fluid material compresses the bubbles. When the mixture of gas and fluid material is dispensed from the dispenser 12, the entrained volumes of gas in the bubbles rapidly expand and are trapped after expansion within the fluid material to generate a foamed fluid material. The trapped cells comprise small bubbles of gas distributed throughout the bulk of the fluid material. The bubble distribution may be homogeneous or inhomogeneous depending upon, among other variables, the type of fluid material, the desired density reduction, the residence time in the mixing chamber 30 of mixer 32, and the flow rate of the fluid material. The gas bubbles displace a percentage of the fluid material to primarily yield material savings, as well as to alter/improve the mechanical properties of the dispensed mixture.

In an alternative embodiment, the mixing device 16 may be incorporated into a manifold for a dispensing system, as opposed to being housed by a separate mixing body 26. The mixing body 26 of mixing device 16 includes another inlet opening 130 (FIG. 5), shown as filled by a plug 132 (FIG. 5) coupled by a threaded engagement with opening 130, for the installation of another optional injection device (not shown), similar to injection device 60, to supply gas to the fluid material inside the mixing chamber 30. The additional injection device may be used to effectively increase the rate at which the gas is introduced into the fluid material inside the mixing chamber 30.

The mixing device 16 manages the introduction of gas into the fluid material flowing in the mixing chamber 30. Gas is introduced by injection at a uniform gas flow rate over the entire fluid material dispense cycle. Minimizing the gas volume upstream of control orifice 98 and downstream from control orifice 98 may operate to minimize delays in gas injection at the beginning and end of each dispense cycle. The dispensing system 10 and mixing device 16 provide a compact, low cost, standalone device that can be integrated into virtually any fluid material dispensing system and used for dispensing a wide variety of different fluid materials. The proper gas pressure may be determined from observation of the dispensed foamed fluid material.

The simplicity of the mixing device 16 may provide cost advantages in comparison with conventional mixing devices and schemes used in the production of foamed fluid materials. For example, the mixing device 16 does not require a sophisticated control system to dynamically control the introduction of gas into the fluid material based upon feedback from flow rate measurements. As another example, the mixing device 16 does not require a two-stage gear pump for introducing the gas into the fluid material.

The gas pressure of the gas discharged from the outlet 66 for injection into the fluid material exceeds the fluid pressure of the fluid material. The injection device 60 controls gas flow into the fluid so as to maintain a consistent rate of gas flow into the fluid, particularly when the flow of the fluid material is cycled on and off. In this situation, the injection device 60 is cycled on and off in unison with the fluid flow through the mixing chamber 30 in an attempt to maintain the desired ratio of gas to fluid material (i.e., density reduction). The control orifice 98 of the injection device 60 operates as a metering device to control gas flow when the injection device 60 is open. In addition, the check valve 96 prevents fluid material from migrating upstream into the control orifice 98 and passageways 100, 102 and, as a consequence, causing blockage of the gas flow path. As described above, the interface between the fluid material and the gas is located near the seat 114 but between the seat 114 and the outlet 66.

When the injection device 60 and dispenser 12 are closed (i.e., no gas or liquid flow), a pressure differential exists (in favor of the fluid) causing the check valve 96 to be held closed by the fluid material. Shortly after the dispenser 12 opens, the injection device 60 opens as well. Gas begins flowing into the fluid material in the mixing chamber 30 with a brief time delay until the gas pressure overcomes the fluid pressure acting on the plunger 106 on the check valve 96. The duration of this time delay is primarily governed by the gas pressure and the volume of gas in the gas chamber 104 between the control orifice 98 and the check valve 96. Decreasing the volume of gas in the gas chamber 104 reduces the time delay.

When the balance of forces between the gas and fluid shift to cause the plunger 106 of check valve 96 to unseat from seat 114, gas begins to enter the mixing chamber 30. The gas introduction rate from the injection device 60 into the mixing chamber 30 may be initially rapid as an initial surge of gas pressure when plunger 106 is pushed off its seat 114 and eventually reaches a steady state operating condition. Once the steady state operating condition is achieved, the ratio of gas to liquid remains relatively constant over time.

At the conclusion of the fluid dispense cycle, the dispenser 12 and the injection device 60 close. Gas continues to flow until the gas pressure in the gas chambers 102, 104 bleeds down, which permits the balance of forces to shift and, eventually, causes the plunger 106 of the check valve 96 to re-seat on seat 114 and halt gas flow.

The volume of gas chambers 102, 104 between the control orifice 98 and the seat 114 of check valve 96 is a factor in determining the response time of the check valve 96. Minimizing the volume of the gas chambers 102, 104 makes the operation of the check valve 96 more synchronous with the operation of the dispenser 12. This synchronicity assists in minimizing swings or variation in the density reduction of the process fluid material. When the injection device 60 is cycled to an open condition, the gas chambers 102, 104 must be filled with gas at the gas supply pressure level pressure to lift the plunger 106 off the seat 114 and thereby initiate gas flow. Reducing the volume of the gas chambers 102, 104 increases the rate at which the gas chambers 102, 104 can be brought to the gas supply pressure level at beginning of a dispense cycle. In addition, minimizing the volume of the gas chambers 102, 104 permits the gas pressure in the gas chamber 104, which maintains the plunger 106 lifted off the seat 114, to be vented in a shorter time as the injection device 60 is cycled to the closed condition. The ability to quickly relieve the gas pressure in gas chambers 102, 104 promotes prompt discontinuation of the gas flow from gas outlet 66 of the injection device 60.

References herein to terms such as "vertical", "horizontal", etc. are made by way of example, and not by way of limitation, to establish a frame of reference. It is understood that various other frames of reference may be employed. Consequently, the use of these and other directional words in the description should not be used to imply any particular absolute directions.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicants' general inventive concept.

What is claimed is:

1. An apparatus for dispensing a mixture of a pressurized gas and a fluid material, the apparatus comprising:
   a mixing device including a mixing chamber confining a stream of the fluid material and a mixer inside said mixing chamber, said mixer configured to combine the pressurized gas with the stream of the fluid material to form the mixture;
   a dispenser coupled in fluid communication with said mixing chamber, said dispenser configured to receive and dispense the mixture; and
   a gas injection device having a main body, a gas passage extending through said main body, an inlet to said gas passage that is configured to receive the pressurized gas, and a control orifice in said gas passage, a nozzle coupled with the main body and having an outlet coupling said gas passage in fluid communication with said mixing chamber of said mixing device, and a flow control element located in said gas passage between said inlet to said gas passage and said outlet from said nozzle, said control orifice configured to meter a flow rate of the pressurized gas to said outlet and into said mixing chamber, and said flow control element including a plunger, a seat between said inlet and said control orifice, and a biasing element applying a biasing force that urges said plunger into contact with said seat, said plunger movable relative to said seat to provide a first condition in which the pressurized gas can flow in said gas passage from said inlet through said control orifice to said outlet and a second condition in which the pressurized gas is blocked from flowing to said outlet.

2. The apparatus of claim 1 wherein said flow control element is located in said gas passage between said control orifice and said outlet from said nozzle.

3. The apparatus of claim 1 wherein said plunger is movable relative to said seat to provide the first condition when a fluid pressure between said plunger and said inlet exceeds a sum of the biasing force and a fluid pressure between said plunger and said outlet, and said plunger movable to provide the second condition when the fluid pressure between said plunger and said outlet exceeds the sum of the biasing force and the fluid pressure between said plunger and said inlet.

4. The apparatus of claim 3 wherein said plunger has a non-contacting relationship with said seat in said first condition of said flow control element, and said plunger has a contacting relationship with said seat in said second condition of said flow control element.

5. The apparatus of claim 1 wherein said gas injection device further includes a gas chamber between said seat and said control orifice.

6. The apparatus of claim 5 wherein said gas chamber has a volume of about one cubic centimeter or less.

7. The apparatus of claim 1 wherein said gas injection device includes a sealing seat in said gas passage between said inlet and said outlet, and further comprising:
   a needle tip movable relative to said sealing seat between an open position in which said needle tip is separated from said sealing seat to permit the pressurized gas to flow past said sealing seat and a closed position in which said needle tip contacts said sealing seat to block a flow of the pressurized gas; and
   an actuator mechanically coupled with said needle tip, said actuator adapted to move said needle tip relative to said sealing seat between said open and closed positions.

8. The apparatus of claim 7 wherein said control orifice is located between said sealing seat and said outlet.

9. The apparatus of claim 1 wherein said control orifice has an effective diameter of about 0.001 inches to about 0.002 inches.

10. An apparatus for dispensing a mixture of a pressurized gas and a fluid material, the apparatus comprising:
    a mixing device including a mixing chamber confining a stream of the fluid material and a mixer inside said mixing chamber, said mixer configured to combine the pressurized gas with the stream of the fluid material to form the mixture;
    a dispenser coupled in fluid communication with said mixing chamber, said dispenser configured to receive and dispense the mixture; and
    a gas injection device having a main body, a gas passage extending through said main an inlet to said gas passage that is configured to receive the pressurized gas, a nozzle coupled with the main body and having an outlet coupling said gas passage in fluid communication with said mixing chamber of said mixing device, and a flow control element located in said gas passage between said inlet to said gas passage and said outlet from said nozzle, and said flow control element including a plunger, a seat between said inlet and said control orifice, and a biasing element applying a biasing force that urges said plunger into contact with said seat, said plunger movable relative to said seat to provide a first condition in which the pressurized gas can flow in said gas passage from said inlet through to said outlet and a second condition in which the pressurized gas is blocked from flowing to said outlet.

11. The apparatus of claim 10 wherein said gas injection device further includes a sealing seat in said gas passage between said inlet and said outlet, a needle tip, and an actuator coupled with said needle tip, said actuator configured to move said needle tip relative to said sealing seat between an open position in which said needle tip is separated from said sealing seat to permit the pressurized gas to flow past said sealing seat and a closed position in which said needle tip contacts said sealing seat to block a flow of the pressurized gas.

12. The apparatus of claim 11 further comprising:
    a control system electrically coupled with said actuator of said gas injection device, said control system configured to cause said actuator to move said needle tip from the closed position to the open position when said dispenser is operated to dispense the mixture.

13. The apparatus of claim 11 wherein said flow control element is located between said sealing seat and said outlet.

14. The apparatus of claim 10 wherein said plunger is movable relative to said seat to provide the first condition when a fluid pressure of the pressurized gas between said plunger and said inlet exceeds a sum of the biasing force and a fluid pressure of the fluid material between said plunger and said outlet, and said plunger movable to provide the second condition when the fluid pressure of the pressurized gas between said plunger and said outlet exceeds the sum of the biasing force and the fluid pressure of the fluid material between said plunger and said inlet.

15. The apparatus of claim 10 wherein said injection device includes a control orifice located in said gas passage between said inlet and said outlet, said control orifice configured to meter a flow rate of the pressurized gas to said outlet.

16. The apparatus of claim 15 wherein said flow control element is located between said control orifice and said outlet.

17. The apparatus of claim 10 further comprising:
a control system electrically coupled with the dispenser and with said gas injection device, said control system operative to regulate injection of the pressurized gas from said gas injection device into the fluid material in said mixing chamber.

\* \* \* \* \*

UNITED STATES PATENT AND TRADEMARK OFFICE
CERTIFICATE OF CORRECTION

PATENT NO.        : 7,703,705 B2                                     Page 1 of 1
APPLICATION NO.   : 11/939150
DATED             : April 27, 2010
INVENTOR(S)       : Charles P. Ganzer It is certified that error appears in the above-identified patent and that said Letters Patent is hereby corrected as shown below:

In column 14, line 34, after "main", insert --,--.

Signed and Sealed this

Seventh Day of September, 2010

David J. Kappos
*Director of the United States Patent and Trademark Office*